Figure 5:
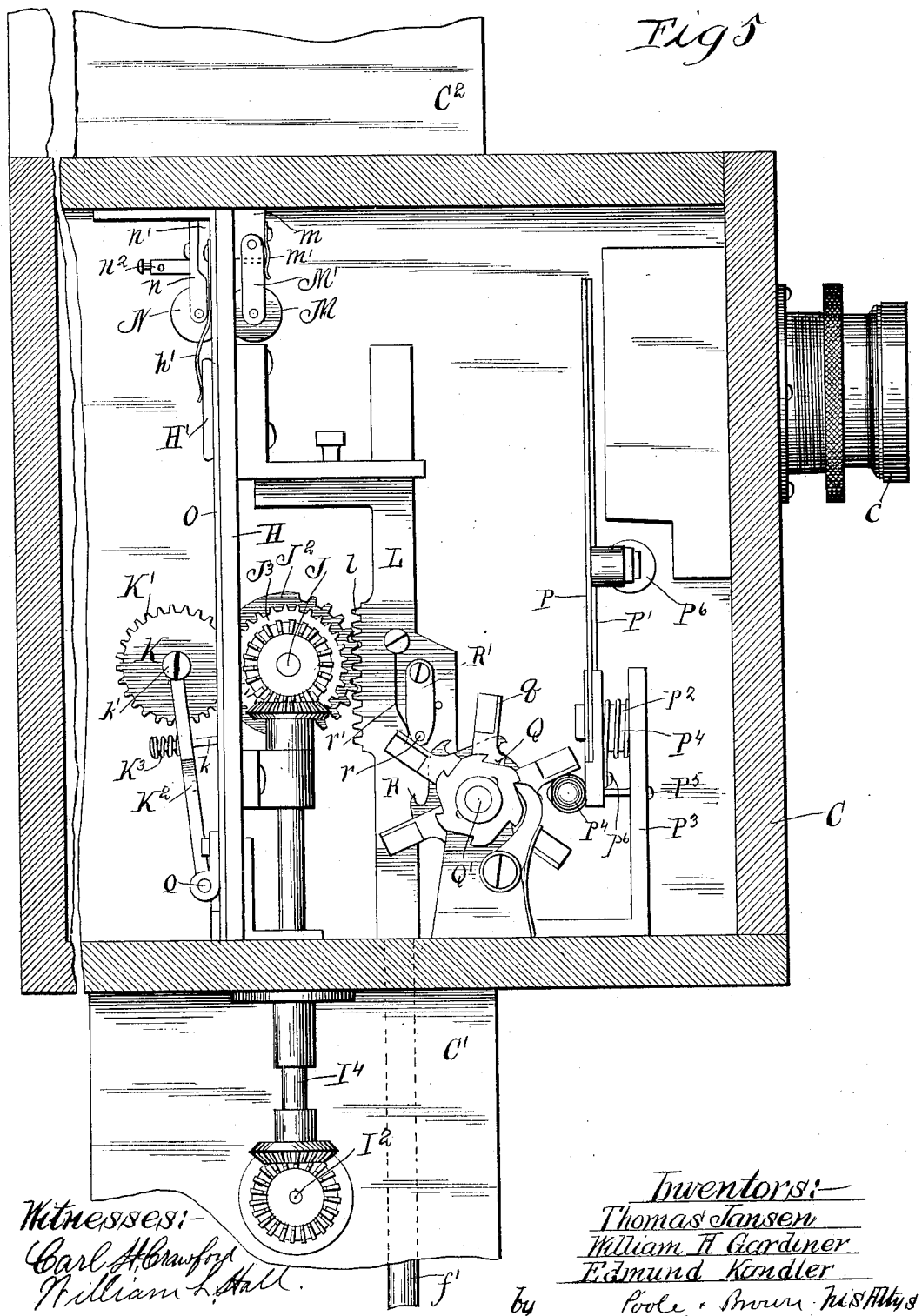

No. 655,977. Patented Aug. 14, 1900.
T. JANSEN, W. H. GARDINER & E. KANDLER.
APPARATUS FOR RECORDING PAPERS OR WRITINGS.
(Application filed June 12, 1899.)
(No Model.) 6 Sheets—Sheet 1.
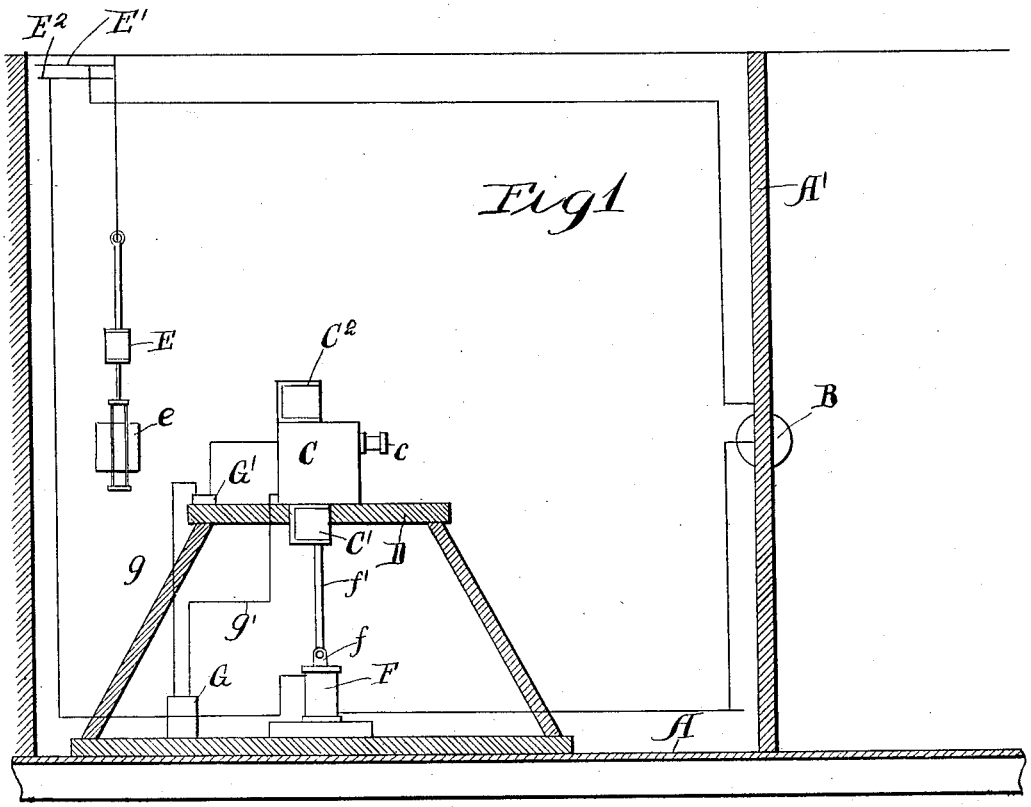
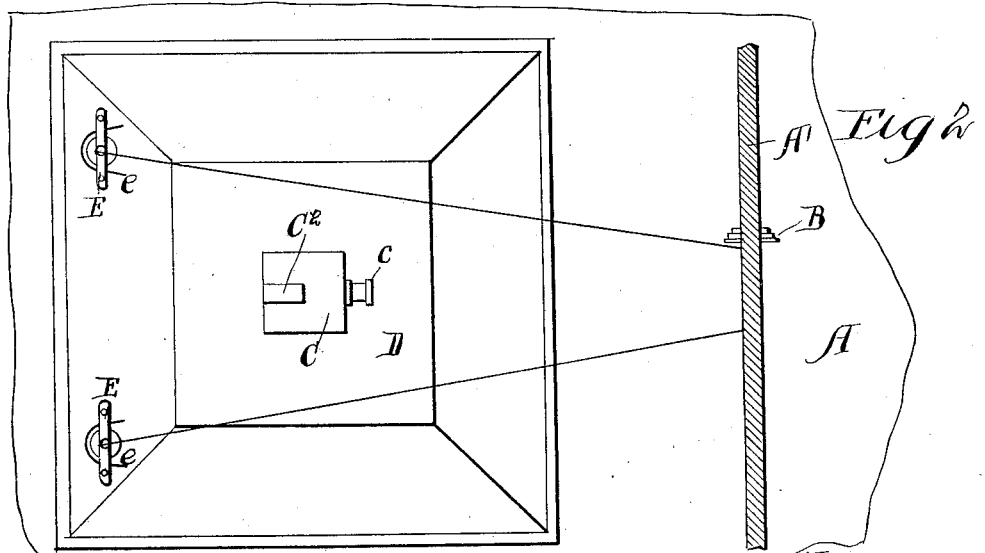
Witnesses:
Carl H. Crawford
William L. Hall
Inventors:
Thomas Jansen
William H. Gardiner
Edmund Kandler
by Poole & Brown his Attys No. 655,977. Patented Aug. 14, 1900.
T. JANSEN, W. H. GARDINER & E. KANDLER.
APPARATUS FOR RECORDING PAPERS OR WRITINGS.
(Application filed June 12, 1899.)
(No Model.) 6 Sheets—Sheet 2.
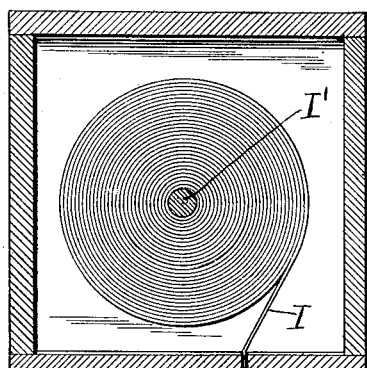
Fig 3
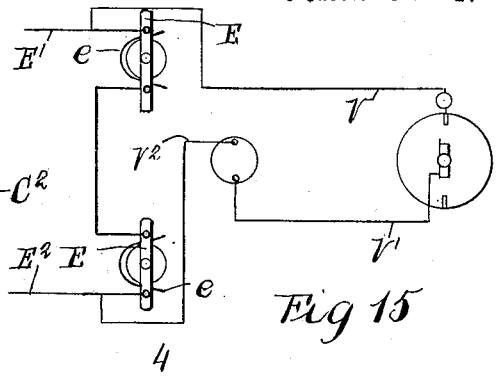
Fig 15
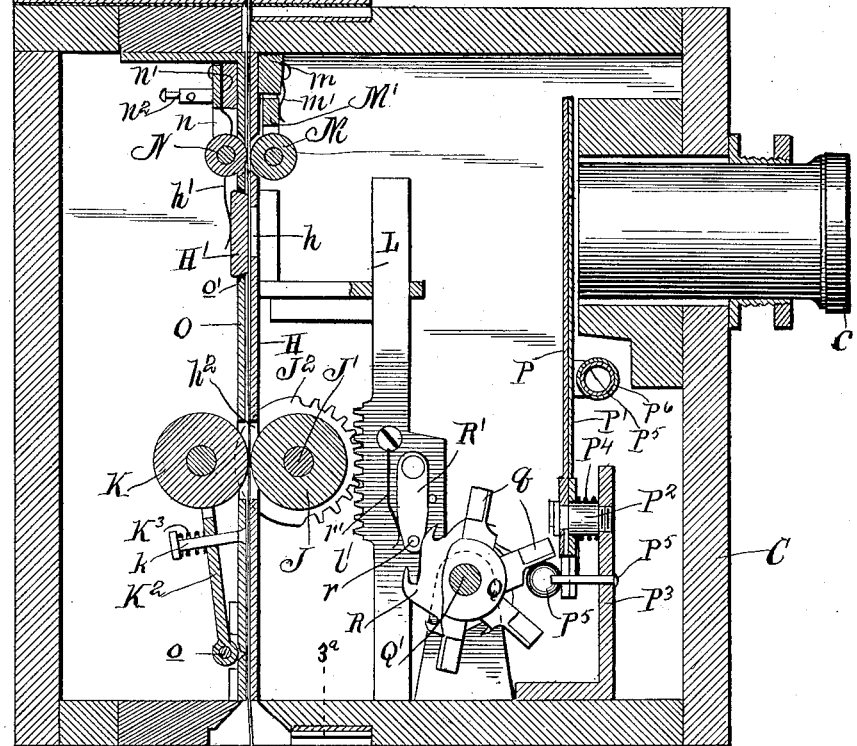
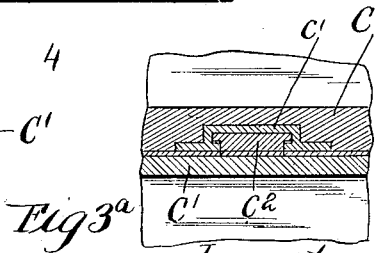
Fig 3ª
Witnesses:
Carl H Crawford
William L Hall
Inventors:
Thomas Jansen
William H Gardiner
Edmund Kandler
by Poole & Brown
their Attys
THE NORRIS PETERS CO., PHOTO-LITHO., WASHINGTON, D. C.

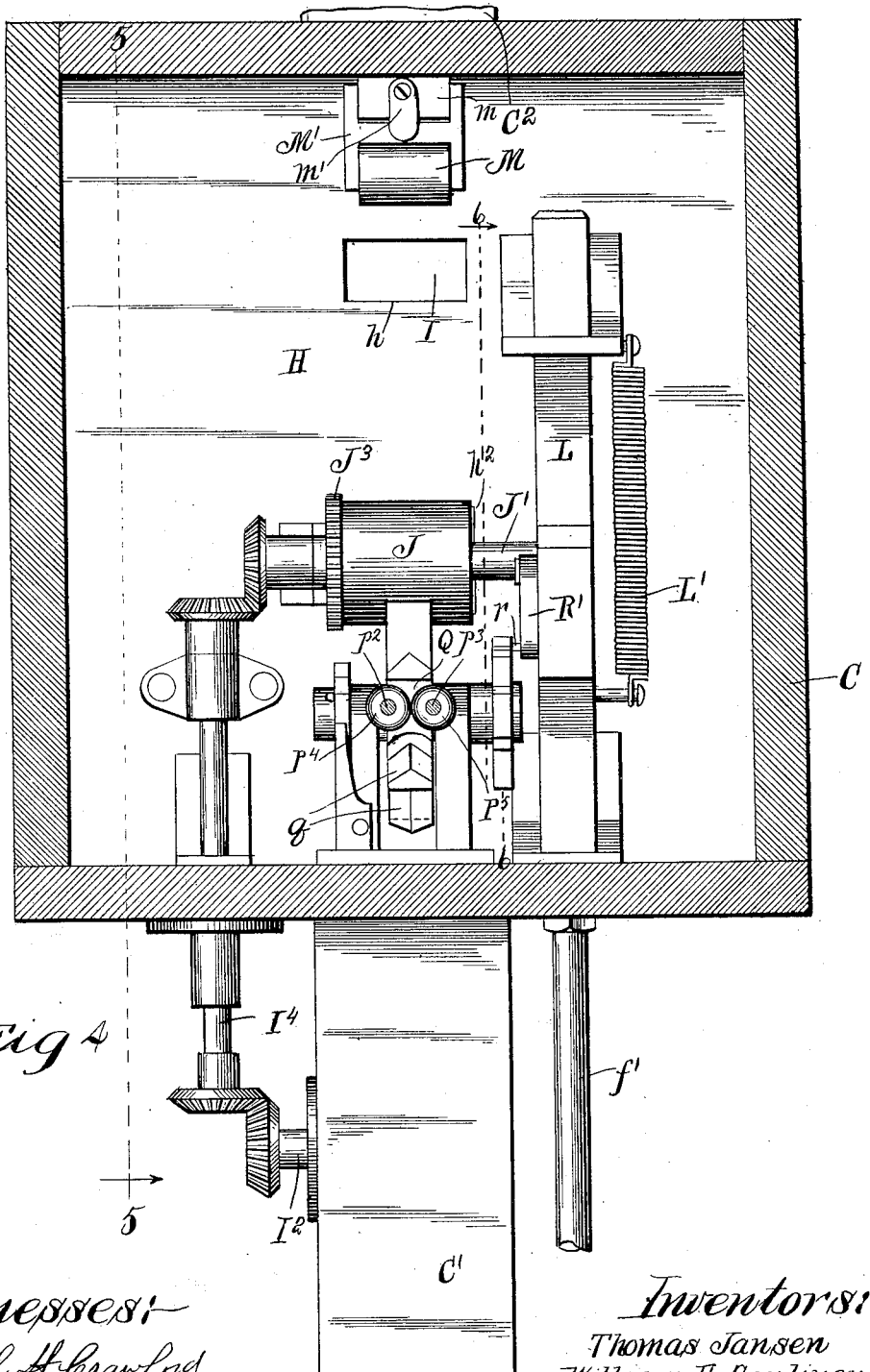

No. 655,977. Patented Aug. 14, 1900.
T. JANSEN, W. H. GARDINER & E. KANDLER.
APPARATUS FOR RECORDING PAPERS OR WRITINGS.
(Application filed June 12, 1899.)
(No Model.) 6 Sheets—Sheet 4.

No. 655,977. Patented Aug. 14, 1900.
T. JANSEN, W. H. GARDINER & E. KANDLER.
APPARATUS FOR RECORDING PAPERS OR WRITINGS.
(Application filed June 12, 1899.)
(No Model.) 6 Sheets—Sheet 5.
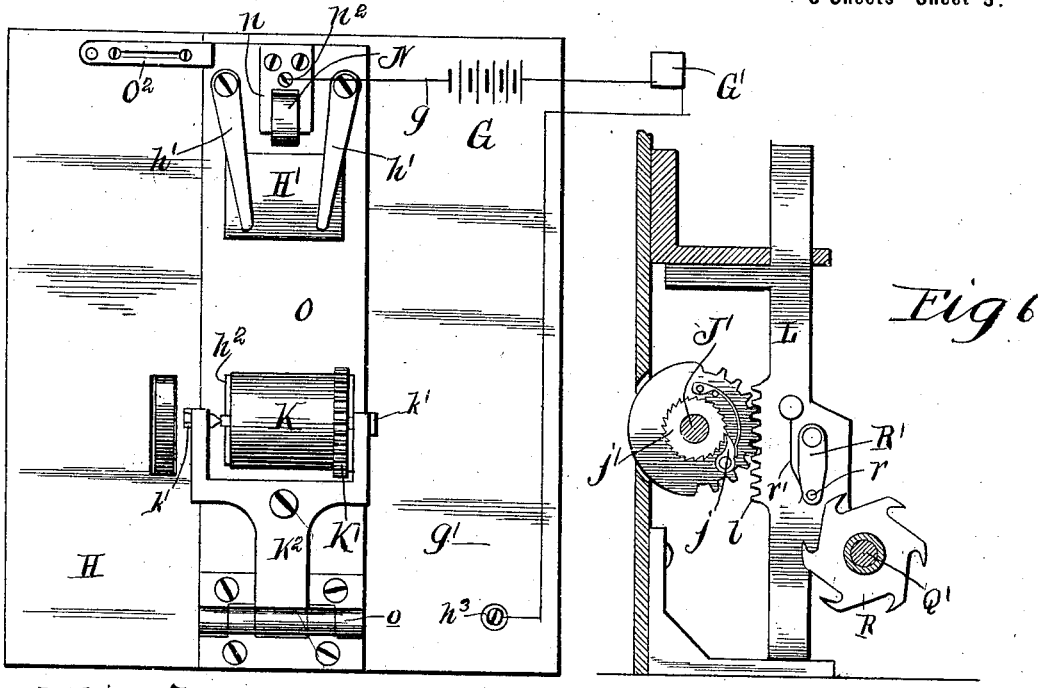
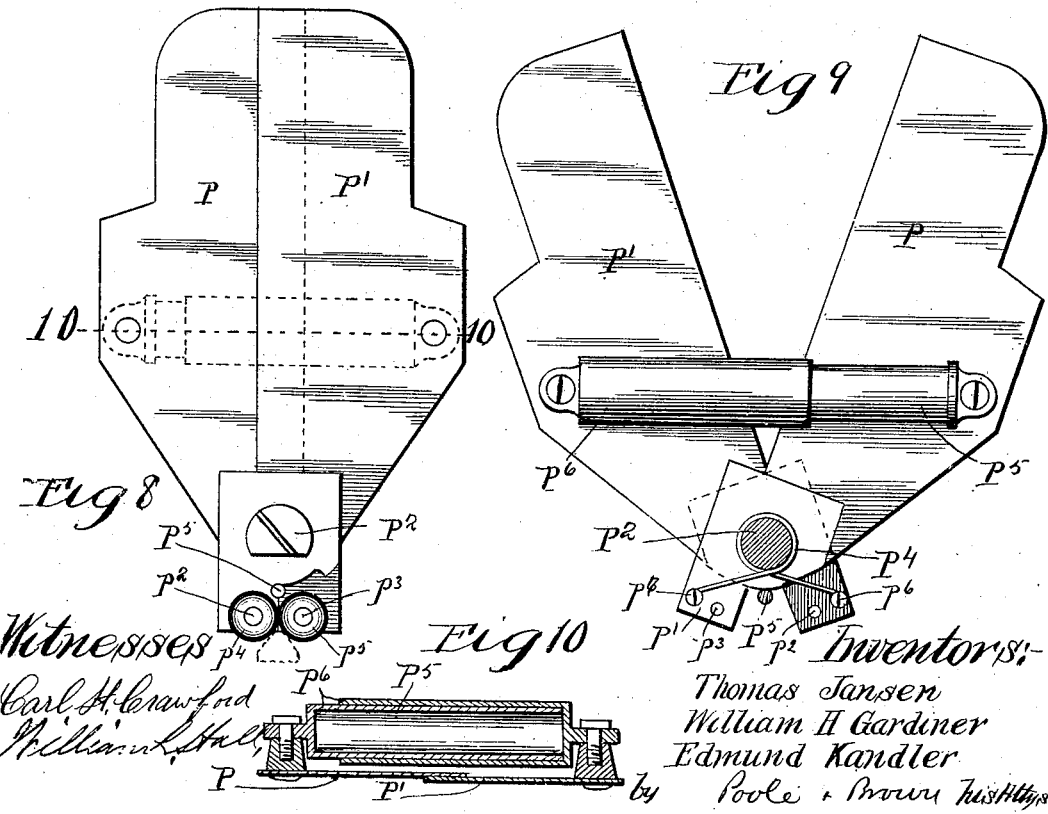
Witnesses
Carl H. Crawford
William L. Stahl
Inventors:—
Thomas Jansen
William H Gardiner
Edmund Kandler
by Poole & Brown his attys No. 655,977. Patented Aug. 14, 1900.
T. JANSEN, W. H. GARDINER & E. KANDLER.
APPARATUS FOR RECORDING PAPERS OR WRITINGS.
(Application filed June 12, 1899.)
(No Model.) 6 Sheets—Sheet 6.
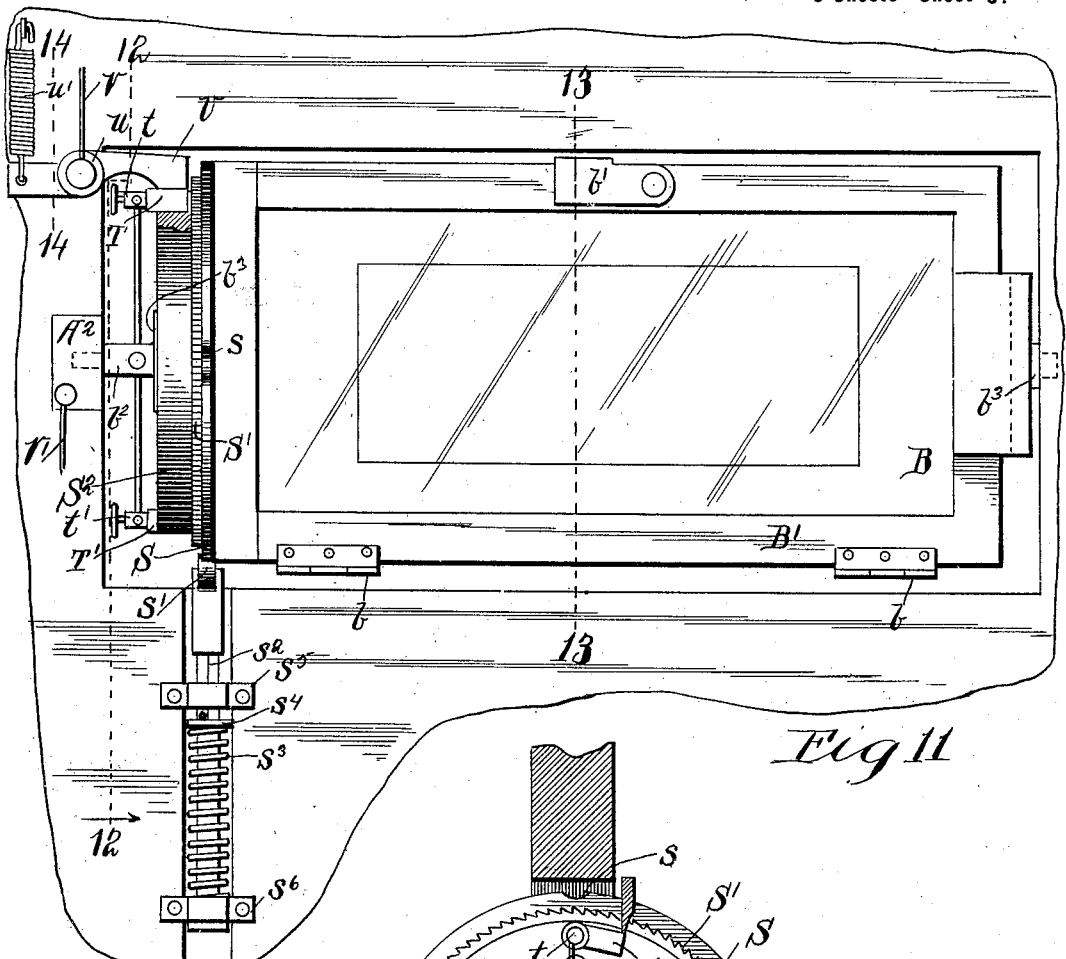
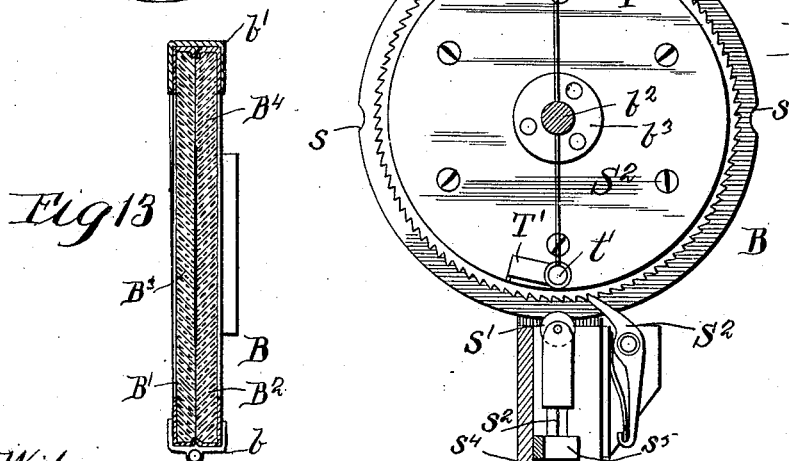
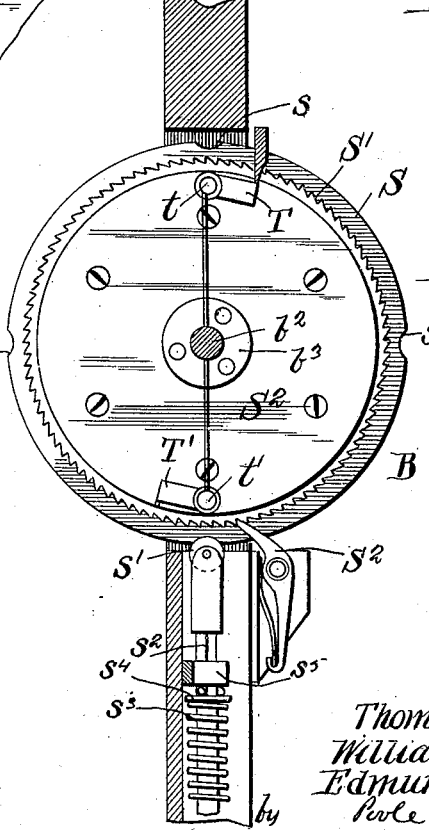
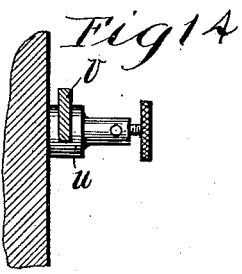
Witnesses:—
Carl H. Crawford
William L. Hall
Inventors:—
Thomas Jansen
William H. Gardiner
Edmund Kandler
THE NORRIS PETERS CO., PHOTO-LITHO., WASHINGTON, D. C.

UNITED STATES PATENT OFFICE.

THOMAS JANSEN, WILLIAM H. GARDINER, AND EDMUND KANDLER, OF CHICAGO, ILLINOIS; SAID KANDLER ASSIGNOR TO SAID JANSEN AND GARDINER.

APPARATUS FOR RECORDING PAPERS OR WRITINGS.

SPECIFICATION forming part of Letters Patent No. 655,977, dated August 14, 1900.

Application filed June 12, 1899. Serial No. 720,176. (No model.)

*To all whom it may concern:*

Be it known that we, THOMAS JANSEN, WILLIAM H. GARDINER, and EDMUND KANDLER, of Chicago, in the county of Cook and State of Illinois, have invented certain new and useful Improvements in Apparatus for Recording Papers or Writings; and we do hereby declare that the following is a full, clear, and exact description thereof, reference being had to the accompanying drawings, and to the letters of reference marked thereon, which form a part of this specification.

This invention relates to a novel apparatus for recording checks, drafts, and other writings or evidences of value in such manner that the record shall show a photographic facsimile of each paper to be recorded, the object being to afford for the use of banks, business houses, and the like a method and means by which an exact record may be kept of the commercial paper which passes through the bank or business house, which record may be retained after such papers have been delivered or pass out of the control of the bank or business house.

The invention consists in the matters hereinafter described, and pointed out in the appended claims.

An apparatus adapted for carrying out our invention embraces generally a photographic camera provided with means for intermittingly advancing or feeding a sensitized strip or film, a holder for the papers to be recorded adapted to hold the same flat and to movably sustain the said papers in such manner that either side thereof may be presented before the camera, a shutter-actuating mechanism, and means for illuminating the papers placed in said holder. As an additional feature the apparatus shown also embraces connecting means between the movable holder and the strip-feeding mechanism, whereby the turning of the holder to present opposite faces of the checks and papers to the camera will operate the strip or film feeding devices and also operate the shutter by which the exposure of the strip is controlled.

The invention may be better understood by reference to the accompanying drawings, in which—

Figure 1 is a sectional elevation of an apparatus embodying our invention, showing the main parts thereof in side view. Fig. 2 is a plan view of the parts shown in Fig. 1. Fig. 3 is an enlarged detail section of the parts within the camera shown in Fig. 1. Fig. 4 is a sectional elevation of said parts, taken on line 4 4 of Fig. 3. Fig. 5 is a similar vertical section taken on line 5 5 of Fig. 4. Fig. 6 is a detail section taken on line 6 6 of Fig. 4, showing the parts of the strip-feeding mechanism. Fig. 7 is a front elevation of the parts of the strip-feeding mechanism at the rear of the guide-plate shown in Fig. 6. Fig. 8 is a view of the shutters, with the actuating mechanism therefor. Fig. 9 is a view of the same parts, showing the shutters in their open position. Fig. 10 is a detail section taken on line 10 10 of Fig. 8. Fig. 11 is a face view, with parts in section, of the holder or supporting device for the papers to be recorded. Fig. 12 is a sectional view taken on line 12 12 of Fig. 11. Fig. 13 is a detail section taken on line 13 13 of Fig. 11. Fig. 14 is a detail section taken on line 14 14 of Fig. 11. Fig. 15 is a diagrammatic view illustrating the electric connections of the apparatus.

As shown in said Fig. 1, A indicates the floor of an apartment in which the apparatus is located, and A' a vertical partition or screen, having an aperture in which is located the holder B, in which the papers to be recorded are placed.

C indicates the casing or housing of a photographic camera, which is supported upon a table or stand D in such position that the object-lens tube $c$ of the camera is directed toward the paper-holder B.

E E are two electric-arc lights located at the rear and either side of the camera and provided with reflectors $e\ e$, arranged to direct the light of the lamps upon and toward the holder B.

F indicates a solenoid which is operated through the same electric current that supplies the lamps E and which is provided with a central vertically-movable plunger $f$, which is connected with operative parts within the camera-housing by a rod $f'$ and serves to give motion to said parts.

G indicates a primary battery connected with the camera by wires $g$ $g'$ and which forms part of an indicating device by which an alarm may be given in case a film on which the record is made is being exhausted. The circuit formed by the said battery and wires includes an alarm-bell G'.

Beneath the casing or housing C of the camera is located a box C', adapted to receive the record-strip after the record has been made thereon, and above said casing or housing is located a similar box or case $C^2$, which contains the roll from which the strip is drawn.

Within the casing or housing C of the camera are located two separate mechanisms—one a strip-feeding device adapted to move or feed the sensitized strip intermittingly past the optical axis of the camera, and the other a shutter-actuating device for admitting light-rays to and cutting them off from the sensitized strip. First referring to the strip-feeding mechanism, the same as herein shown is constructed as follows:

H indicates a vertical stationary guide-plate located transversely of the camera-housing or at right angles to the optical axis of the same. In said plate, in alinement with the object-lens, is located an opening $h$, through which the exposure of the sensitized strip takes place. Said strip, which is indicated by I in the drawings, passes from the box or case $C^2$ above the camera downwardly through the top wall thereof and along the rear face of the plate H in a vertical direction and thence through an opening in the lower wall of the camera-housing to the case C'. Said upper case $C^2$ contains a spool I', from which the strip is drawn and which is adapted to freely rotate, and the lower case C' contains a revolving spindle $I^2$, on which is placed a spool $I^3$, having frictional engagement with said spindle and on which the said strip or ribbon is wound. The strip or ribbon passes over the opening $h$ in the plate H and is held flat against said plate H, where it passes said opening, by means of a flat-faced presser H', arranged behind the plate H and held in contact with the strip by means of suitable springs $h'$ $h'$, Figs. 3 and 6, herein shown as having the form of flat or leaf springs.

Devices are provided for moving or feeding the strip I, as follows:

J is a feed-roller mounted on a horizontal shaft J' at the front of the plate H and projecting through an aperture $h^2$ in the said plate in position for contact with the front surface of the strip which passes over said aperture, said feed-roller J acting against an opposing spring-pressed feed-roller K, which bears against the rear face of said strip. The feed-rollers J K are located below the opening $h$ and serve to feed the strip by drawing it downwardly past or over said opening. The shaft J' of said feed-roller is mounted in suitable bearings on the plate H. Motion is given to the said feed-roller J through the medium of an oscillating gear-segment $J^2$, which is mounted on the said shaft J adjacent to one end of the feed-roller and having connection with said feed-roller by means of a pawl and ratchet, and a vertically-movable actuating-bar L, which is provided with gear-teeth $l$, intermeshing with the gear-teeth of the oscillating segment $J^2$. As shown in the drawings, Fig. 7, the oscillating segment $J^2$ is provided with a spring-pressed pawl $j$, which engages a ratchet-wheel $j'$, attached to the shaft J'. The actuating-bar L is adapted to slide vertically in suitable guides in the housing and passes at its lower end through the lower wall of said housing and is attached by the connecting-rod $f'$ to the core of the solenoid F. Motion is given to said actuating-rod by said solenoid, it being obvious that when an electric current is passed through the coil of the solenoid the core or plunger will be drawn downwardly therein, thereby depressing the actuating-rod L and giving partial rotation to the gear-segment $J^2$ and the feed-roller J. In the upward movement of the said actuating-rod L, which is accomplished by the action of a lifting-spring L', the gear-segment turns freely on the shaft, the pawl-and-ratchet connection with the feed-roller permitting the gear-segment to turn without turning said feed-roller. Said feed-roller J is provided at one end with a gear-wheel $J^3$, which is adapted to intermesh with corresponding gear-teeth K' on the spring-pressed feed-roller K, so that said rollers J and K turn in unison, thereby affording a positive and certain rotation of both feed-rollers and a correspondingly positive and certain advance movement of the strip.

The spindle $I^2$ for the spool $I^3$ is driven from the shaft J' of the feed-roller by means of an upright shaft $I^4$, connected by bevel-gears with said shaft.

Between the aperture $h$ in the plate H and the spool I', from which the strip is drawn, are located two opposing presser-rollers M N, which bear upon opposite sides of the strip and form part of an indicating device to show to the operator when the record-strip on the supply-spool is exhausted. Said roller M is held by spring-pressure against the strip, the same being mounted in the spring-arm M', which is pivoted to a supporting-block $m$ and against which bears a leaf-spring $m'$, attached to said block. The roller N is stationary and mounted in a supporting-arm $n$.

To facilitate the insertion of the sensitized strip, the presser H', the presser-roller K, and the presser-roller N instead of being mounted directly on the plate H are secured to a separate vertically-arranged plate O, which extends over the path of the strip and the rear face of said plate H and is pivoted at its lower end to said plate by means of a hinge or pivotal joint $o$. The presser H' is supported in position with relation to the plate O by engagement with an opening $o'$ in said plate O, which opening is somewhat larger than the opening $h$, the said presser H' being provided with a laterally-projecting part or flange at its rear face, so that it cannot pass entirely through the opening $o'$, while at the same time it is free to press against the strip I when the plate O is in position against the plate H. The springs $h'$ are attached at their upper ends to the plate O, as clearly seen in Figs. 5 and 6, it being obvious from this construction that when the upper end of the plate O is swung rearwardly away from the plate H the presser H', with its pressure-springs, will be moved away from the plate H, thereby enabling the free end of the strip to be readily inserted between said presser and the plate H, which constitutes a guide-plate for the strip.

The presser-roller K is mounted on a hinged arm $K^2$, which is pivotally supported at its lower end in such manner as to permit its upper end to swing with said roller toward and from the strip, such arm being conveniently mounted on the same pivot $o$ by which the plate O is connected with the plate H. To afford suitable spring-pressure of the roller K toward or against the roller J, a spring $K^3$ is employed, said spring being of coiled form and being interposed between the rear face of the arm $K^2$ and a suitable head on a stud $k$, which passes through an opening in the arm and is secured in the plate O. The arm $K^2$ is provided with a forked outer end, between the prongs of which the roller K is journaled by means of bearing-studs $k'k'$, inserted through the forked ends, and having conical inner ends which engage axial pins on the ends of said roller.

The presser-roller N and its supporting-plate $n$ are secured to the upper end of and carried by the plate O, so that said roller N will be swung away from the roller M when the plate O is moved rearwardly, thereby leaving the rear or guiding face of the plate H entirely exposed, so that the strip may be easily laid against the same when first inserting it into the apparatus. For holding the plate O in its operative position a horizontally-sliding latch $O^2$ is secured to the upper part of the plate H in position to engage the said plate O, as clearly seen in Fig. 6.

In connection with the battery G, conducting-wires $g\ g'$, plate O, and rollers M and N, hereinbefore described as forming a part of the alarm device for indicating when the strip is exhausted, devices are provided as follows: The roller N is insulated from the plate O by means of a block $n'$, of insulating material, inserted between the supporting-plate $n$ and said plate O, and said plate $n$ is provided with a binding-screw $n^2$, with which is connected one of the wires $g$ from said battery, which wire extends through the housing of the camera to the binding-screw, said battery being indicated diagrammatically in Fig. 6. The opposite terminal of the battery-wire $g$ is connected with the plate H, being for this purpose carried through the housing of the camera and attached to a binding-post $h^3$ on the said plate, as seen in said Fig. 6. The presser-roller M being in electrical connection with the plate M it follows that so long as the strip is interposed between said rollers M and N said strip constitutes an insulation between the said rollers and no current can pass; but as soon as the end of the strip passes from between said rollers the latter are brought together by the pressure of the actuating-spring of the roller M, and the circuit is then completed through the said rollers and the plate H to the opposite terminals of the battery, thereby actuating the alarm-bell G', which is in said circuit.

The shutters and shutter-actuating devices are made as follows:

P P' indicate two shutters which are arranged inside of the housing with their upper ends opposite the object-lens tube, said shutters being arranged to swing in vertical planes and being pivotally supported at their lower ends by a pivot-stud $P^2$, which is secured in a bracket $P^3$, attached to the bottom of the camera-housing, the lower ends of the shutters overlapping each other where they engage said stud $P^2$, as clearly seen in Figs. 8 and 9. The said shutters P and P' are provided at their lower ends with depending arms $p\ p'$, carrying pivot-studs $p^2\ p^3$, upon which are mounted antifriction-rollers $p^4 p^5$. The shutters are held normally in their closed position by means of a suitably-applied spring, herein shown as having the form of a coiled spring $P^4$, which is coiled around the stud $P^2$ and has two projecting ends which bear or press against pins $p^6 p^7$, which project from the forward faces of the arms $p'$ of the shutters, the ends of said springs pressing in such direction upon said pins as to tend to close the shutters or throw their upper ends toward each other. A stationary horizontal pin or stud $P^5$ is inserted in the bracket $P^3$ and projects rearwardly between the arms $p\ p'$ of the shutters at a point below the stud $P^2$, said pin serving by its contact with the inner edges of the arms when the shutters are closed to hold the same in their central or upright position. The studs $p^2\ p^3$ extend from the rear face of the shutter-arms, and the rollers thereon, which are conveniently made of spherical form, are adapted for engagement with radial arms $q$ on a revolving actuating-wheel Q, which is mounted in the camera-housing opposite and adjacent to the lower ends of the shutters. Said wheel Q is mounted on a horizontal shaft Q', and its arms $q$ rotate in a vertical plane perpendicular to the plane in which the shutters move. Said arms $q$ are located centrally opposite the pivot-stud of the shutters, and the arms are made with inclined contact-faces, or of V shape, as seen in end view, with their acute edges in the plane of rotation of the wheel, and the rollers $p^4$ $p^5$ are so disposed with relation to said arms $q$ that when the shutters are closed the arms will pass between and separate said rollers, thereby spreading apart the shutters or opening the same each time one of said arms engages and passes between said rollers.

$P^5$ and $P^6$ indicate an air cylinder and piston which are pivoted to the shutters and operate in a familiar manner to control the closing of the same.

Provision is made for intermittingly actuating or turning the wheel Q so as to carry one of its arms into engagement with and past the bearing-rollers of the shutters each time it is desired to open said shutters, said actuating means being operated through the vertically-movable actuating-bar L and being constructed as follows: Attached to the wheel Q is a ratchet-wheel having peripheral teeth or notches arranged at the same angle or distance apart and corresponding in number with the arms $q$. The said ratchet-wheel is located at one side of the bar L, and upon said bar is mounted a spring-pressed pawl R', having a laterally-projecting stud $r$ adapted for engagement with the teeth of the ratchet-wheel. The pawl R' is actuated by a leaf-spring $r'$, attached to the said bar L. These parts are so arranged that each time the bar L is depressed by the action of the solenoid for the purpose of turning the feed-rollers J and K the pawl R' will engage one of the teeth of the ratchet-wheel and turn the latter far enough to carry one of the arms $q$ between and past the bearing-rollers on the shutters, thereby quickly opening the shutters and allowing the same to again close. The parts R, moreover, are so arranged or proportioned that the actuation of the shutters will take place after the feed-rollers have been moved and the strip fed far enough to bring a new portion thereof into position to receive an impression, the pawl R' for this purpose being so arranged that when the bar L is at the upper limit of its movement the pin $r$ will stand considerably above that one of the pawl-teeth which is at the time in position for engagement with the same, so that said bar L will need to descend a considerable distance before the tooth of the ratchet-wheel is struck and the ratchet-wheel is turned by said pawl.

The devices above described afford a means by which the sensitized strip may be fed or advanced intermittingly or by a step-by-step movement, and the shutters may at the same time be automatically moved at suitable intervals to expose said strip or film to the action of the light entering through the object-lens, both the feeding devices and the shutter being actuated through a single vertically-movable bar L, which in the construction illustrated is operated through the medium of the solenoid described. So far as these devices are concerned, however, they may of course be operated by means which are strictly mechanical instead of electrical in their character, the operation of the parts within the camera-housing being the same whatever be the motive power employed for moving or actuating the said bar L.

Next referring to the means for holding or sustaining the checks or the like while being photographed by the apparatus described, these parts are constructed as follows:

The holding device, which is located in the screen A' and indicated by the letter B in Fig. 1, as before mentioned, has the form of a rotative double frame consisting of two open frames B' B², which are connected with each other at one side by hinges $b$ $b$ and are adapted to be spread apart or opened at their opposite edges and to be held together by a suitable fastening device herein shown as consisting of a pivoted clip $b'$. In the frames B' B² are secured glass plates B³ B⁴, the inner faces of which are adapted for contact with each other and between which are placed the checks or other written instruments or writings to be recorded. One of the frames—in the instance shown the frame B'—is provided at its ends with bearing pivots or trunnions $b^2$ $b^3$, which are mounted in suitable bearings attached to the screen A' and which enable the holder to be revolved or rotated, so as to present opposite sides of the paper held in the holder toward the camera. Attached to the said frame B' at one end of the holder is a disk S of circular form, preferably made of metal, and attached to the outer face of said disk or made in one piece therewith is a ratchet-wheel S', somewhat smaller in diameter than the disk S. Attached to the outer face of the ratchet-wheel S' is a disk S², made of insulating material, preferably vulcanite or vulcanized fiber, said last-named disk being herein shown as secured by screws to the ratchet-wheel and being somewhat smaller in diameter than said ratchet-wheel. The disk S is provided with four peripheral notches $s$, which are adapted for engagement with a spring-actuated holding piece or pawl, herein shown as having the form of a roller $s'$, mounted on a radially-movable rod $s^2$, which is thrown toward the disk by a coiled spring $s^3$, applied between a collar $s^4$ on the rod and the lowermost of the two guides or bearings $s^5$ $s^5$, Fig. 11, in which the rod $s^2$ slides. The notches $s$ in the disk S are so located that the engagement of the roller $s'$ therewith will maintain the holder either in its vertical position with either face toward the camera or in a horizontal position, in which latter position it will be placed when it is opened for the insertion of the papers to be recorded. The ratchet-wheel S' is engaged by a spring-actuated pawl S², which serves to prevent the holder being turned backward, or, in other words, insures that it will be rotated always in the same direction. In the disk S², of insulating material, are inserted two contact-strips T T', which extend across the cylindric face of the disk flush with the same and are connected at their outer ends with binding-posts $t\ t'$, said binding-posts being connected by wires $t^2\ t^3$ with the metal pivot or trunnion $b^2$, which latter engages a metal bearing on the screen A', but is electrically insulated from the other metal parts of the holder by being secured to or in the insulating-disk $S^2$ preferably by means of a disk $b^3$, made integral with the trunnion and secured by screws to the disk $S^2$.

U indicates a spring-actuated contact-piece which rests or bears against the peripheral surface of the disk $S^2$ and is adapted for contact with the contact-strips T T' in said disk. Said contact-piece U is shown as having the form of a lever pivoted on the stud $u$ in such manner as to swing in a radial plane, a contractile coiled spring $u'$ being attached to the lever U and to the screen A' in such manner that it tends to hold or press the said lever U into contact with the insulating-disk. A wire V, forming part of the same circuit in which the solenoid is located, is attached to the pivot $u$, and said pivot is electrically insulated from the screen A'. Another wire V', also forming a part of said circuit, is attached to the metal bearing $A^2$, in which the trunnion $b^2$ of the holder is journaled. From this construction it is obvious that when the movable contact-piece U is in contact with one of the contact-strips, as T, of the insulated disk the electric circuit will be completed from the wire V through said contact-piece U, the contact-strip T, the wire $t^2$, the pivot $b^2$, and the metal bearing $A^2$ to the wire V' and that such circuit will be broken except when said contact-piece is resting either upon the contact-strip T or T' in said disk. It is obvious, moreover, that inasmuch as the said strips T and T' are diametrically opposite each other on the disk the electric circuit will be completed through such contact at two points only in the revolution of the holder, and the contact-strips are so arranged or disposed that the contact-piece U will rest thereon when the holder stands in a vertical position or with one or the other of its side faces presented to the camera and perpendicular to the optical axis thereof. The holder being free to be rotated by the hand, except so far as it may be temporarily held by the engagement of the notches $s$ with the roller $s'$, it follows that after said holder has been thrown into a horizontal position and the paper has been placed therein and the holder closed when said holder is turned to restore it to its vertical position as soon as it reaches such vertical position an electric current will be completed through the wires V V' in the manner described.

In the drawings, E' E$^2$ indicate electric wires leading to the lamps E E. The wire V, Fig. 14, is shown as extending to one, E', of said wires and the wire V' to one terminal of the solenoid. A wire V$^2$ extends from the other terminal of the solenoid to the wire E$^2$. A branch circuit is formed by these wires, through which current from the electric-lamp circuit is carried through the solenoid and the circuit-closing device connected with the paper-holder. Obviously the solenoid may be operated by a circuit entirely separate and distinct from the lamp-circuit.

The record-strip used in the apparatus will be preferably a small or narrow one, and the negative impression produced on said strip will be minute or much smaller than the original papers which are recorded. By making the impression on the record-strip of small size it is made possible to make a record of many papers on a strip which may be rolled in very small compass, this being a matter of great importance in banks and like institutions where it will be desired to make fac-simile records of many hundreds or even thousands of papers in one day. It is obvious that a large number of record-strips containing such minute impressions may be stored in small compass, this being highly desirable both to make the stored strips convenient of access and to save space in places where the same is valuable.

The method herein described forms the subject-matter of a separate application, Serial No. 726,269, filed August 5, 1899.

We claim as our invention—

1. An apparatus for making a record of writings embracing a photographic camera, supply and receiving rolls for a sensitized record-strip, means for feeding forward or advancing intermittently said sensitized record-strip and for winding it upon the receiving-roll, a shutter and a holder for holding flat the writings to be recorded embracing a transparent plate against which the writings are placed and by which the same are held flat when exposed to the camera.

2. An apparatus for making a record of writings embracing a photographic camera, supply and receiving rolls for a sensitized record-strip, means for feeding forward intermittingly said sensitized record-strip and means for winding it upon the receiving-roll, a shutter and a flat holder for the writings to be recorded mounted to rotate about a central axis to present opposite sides of the writings held in the holder to the camera.

3. An apparatus for making a record of writings, embracing a photographic camera, supply and receiving rolls for a sensitized record-strip, means for intermittingly feeding forward said sensitized record-strip and for winding the same upon the receiving-roll, a holder for the writings constructed to maintain the same flat when presented to the camera, and means for illuminating the writing located at the sides of the holder nearest the camera, and operating to throw the light upon the writing within the holder upon the face thereof which is exposed to the camera.

4. An apparatus for making a record of writings, embracing a photographic camera, supply and receiving rolls for a sensitized record-strip, means for intermittingly feeding forward a sensitized record-strip and winding the same upon the receiving-roll, a movable holder for the writing to be recorded adapted to be moved into and out of position for presenting the writing to the camera and means connecting the holder and feeding devices by which the strip is advanced automatically when the holder is moved to bring each writing in position for exposure.

5. An apparatus for making a record of writings, embracing a photographic camera, supply and receiving rolls for a sensitized record-strip, means for intermittingly feeding forward said sensitized record-strip and winding the same upon the receiving-roll, a shutter, and actuating device therefor, a movable holder for the writings to be recorded, adapted to hold flat the said writings, and which is movable into and out of position for presenting the same to the camera, and connecting means between the holder and feeding means, and the shutter-actuating device, operated through the movement of the holder and producing movement of said feeding means and shutter-actuating device to accord with the movements of the said holder.

6. A photographic camera provided with a guide-plate having an aperture through which the record-strip is exposed, a presser which is held by spring-pressure against the record-strip at the rear of said aperture, feed-rollers between which the record-strip passes, one of said feed-rollers being movable toward and from the other one and being held in contact therewith by spring-pressure, and a hinged plate carrying the presser and movable feed-roll and which may be swung away from the guide-plate to permit the insertion of the record-strip in the camera.

7. The combination with a photographic camera, of supply and receiving rolls for a sensitized record-strip, strip-feeding mechanism for said strip, electrically-operated actuating means for said feeding mechanism, a movable holder for the papers to be recorded, said holder being movable into and out of partitions for presenting the writing held therein to the camera, and a circuit-closing device operated by the movements of said holder.

8. The combination of a photographic camera, of supply and receiving rollers for a sensitized record-strip, feeding mechanism for advancing said strip, shutter-operating mechanism, electrically-operated actuating means for said feeding and shutter-operating mechanism, a movable holder for the papers to be recorded which is movable into and out of position for presentation of the writings to the camera, and a circuit-closing device, operated by the movements of said holder.

9. The combination with a photographic camera, of supply and receiving rolls for a sensitized record-strip, feeding devices for advancing said strips intermittingly, shutter-actuating mechanism, a solenoid which actuates the strip-feeding and shutter-actuating mechanism, an electric circuit including said solenoid, a movable holder for holding flat the papers to be recorded, said holder being movable into and out of position for presenting the papers to the camera and an electric contact device actuated by said holder, and operating to close a circuit through the solenoid when the holder is in position for operation of the camera.

10. The combination of a photographic camera, supply and receiving rollers for a sensitized record-strip, feeding mechanism for advancing said sensitized record-strip, a shutter-actuating mechanism, a solenoid which operates, both the strip-feeding and shutter-actuating mechanisms, a movable holder for the writings to be recorded constructed to hold said writings flat, and which is movable into and out of position for presenting the writings to the camera, and a circuit-closing device actuated by said holder and operating to close the circuit through said solenoid when the holder is in position for the operation of the camera.

11. The combination with a camera, of a holder for papers to be recorded, constructed to hold the same flat, and which is rotative to present opposite sides of the said holder and the papers therein to the said camera, said holder being provided with a disk of insulating material provided with contact-strips, a movable contact-piece mounted on a stationary support and adapted for contact with said disks, a strip-feeding mechanism, a solenoid for actuating said strip-actuating mechanism, and electric connections between said strips on the disk of insulating material and a movable contact-piece and the solenoid, whereby the circuit will be closed to said solenoid when the rotative frame is in position for the operation of the camera.

12. The combination with a camera, of feed-rollers for a record-strip, actuating mechanisms for said feed-rollers embracing an endwise-movable actuating-bar provided with gear-teeth, an oscillatory toothed segment, a pawl-and-ratchet connection between said segment and one of said feed-rollers, shutters, shutter-actuating mechanism and actuating connections between said actuating-bar and the shutter-actuating mechanism.

In testimony that we claim the foregoing as our invention we affix our signatures, in presence of two witnesses, this 9th day of June, A. D. 1899.

THOMAS JANSEN.
WILLIAM H. GARDINER.
EDMUND KANDLER.

Witnesses:
C. CLARENCE POOLE,
CHARLES W. HILLS.